Figure 1:
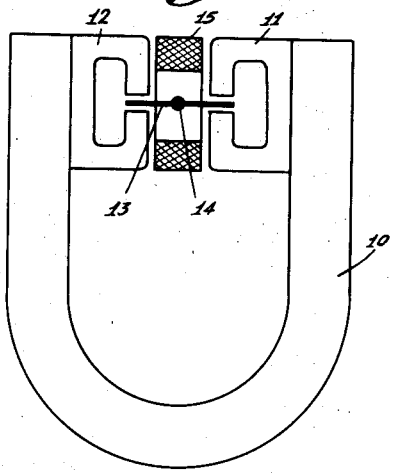

Aug. 4, 1931.     R. VERMEULEN ET AL     1,817,787
MAGNET SYSTEM FOR CONVERTING ELECTRICAL INTO
     MECHANICAL ENERGY OR INVERSELY
          Filed Nov. 1, 1929

INVENTORS
ROELOF VERMEULEN
BY AREND THOMAS VAN URK
ATTORNEY

Patented Aug. 4, 1931

1,817,787

UNITED STATES PATENT OFFICE

ROELOF VERMEULEN AND AREND THOMAS van URK, OF EINDHOVEN, NETHERLANDS, ASSIGNORS TO RADIO CORPORATION OF AMERICA, A CORPORATION OF DELAWARE

MAGNET SYSTEM FOR CONVERTING ELECTRICAL INTO MECHANICAL ENERGY OR INVERSELY

Application filed November 1, 1929, Serial No. 404,169, and in the Netherlands November 13, 1928.

The invention relates to magnet systems for converting electrical into mechanical energy and inversely, which are adapted for use in relays, measuring instruments, telephones, microphones, loudspeakers and similar devices. The invention more particularly relates to magnet systems comprising laminated pole pieces which are traversed both by a constant and by a variable flux.

It has been found that magnetic material which is favorable for a constant flux has frequently unfavorable properties for a variable flux. The invention has for its object to provide pole pieces of such construction that they have favorable properties both for a constant and for a variable flux.

According to the invention, the pole pieces are built up from at least two kinds of laminations which mutually differ in the magnetic properties of the material of which they are made.

In any given magnet system the force acting on the armature will be equal to:

$K = \frac{1}{8\pi} BB'S$, in which

B = the field strength induced by the constant flux,
B' = the field strength induced by the variable flux,
S = the surface of the pole pieces.

After working out this formula, it will be found that $K = \frac{1}{20} \mu \times H \times \mu' \times i \times n \times S$, in which:

$\mu' = \frac{\Delta B}{\Delta H}$ $\mu = \frac{B}{H}$ represents the direct current permeability.

M' represents the alternating current permeability,
i = the current intensity and
n = the number of turns.

From the above formula it is evident that the force acting on the armature depends on the value of B × M' or H × M × M' or again of the product "field strength × direct current permeability × alternating current permeability"; a suitable choice of the field strength and of the increase of the field strength permits to adjust this product for any material at a maximum. By building up the pole pieces from at least two kinds of laminations which have mutually different magnetical properties, the said product can be adjusted at a value higher than that attained with a single material.

In accordance with a mode of realization of the magnet system according to the invention, the laminations of one kind may be made of a material of high direct current permeability whereas those of the other kind are constituted by a material having a high alternating current permeability. For the laminations may be used in this case two kinds of nickel iron, for example, nickalloy, which have different magnetic properties, these differences being obtained by the composition and/or by means of a heat-treatment.

Figure 2:
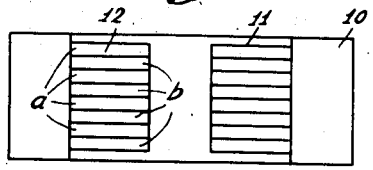
Figure 3:
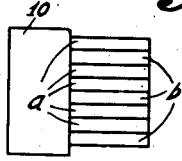

The invention will be more clearly understood by referring to the accompanying drawings which represents, by way of example, one embodiment of the invention. In the drawings:

Figure 1 is a lateral elevation of the magnet system according to the invention; and Figures 2 and 3 represent details of the pole pieces.

Referring to Figure 1, pole pieces 11 and 12 are secured to a permanent magnet 10. An armature 13 surrounded by an alternating current coil 15 is pivoted at 14.

Figure 2 shows the manner in which the pole piece 12 is built up from laminations. These laminations may be grouped in two kinds: kind $a$ and kind $b$. The laminations of kind $a$ consist of a magnetic material of high direct current permeability whereas those of kind $b$ consist of a magnetic material having a high alternating current permeability.

Figure 3 shows that it is not absolutely necessary that the two kinds of the laminations are alternated in turn but that they may also be arranged in any other manner.

Experiments made with two kinds of alloys ($a$ and $b$) having a high direct-current and a high alternating-current permeability respectively gave the following results:

With H=1 Gauss,
Ba=9000  Ma'=700   BaM'a=6.3×10⁶
Bb=3500  Mb'=1500  BbMb'=5.3×10⁶

Consequently, when exclusively laminations of kind $a$ are utilized, the product BaMa′ or "field strength × direct current permeability × alternating current permeability is equal to $6.3 \times 10^6$.

When exclusively laminations of kind $b$ are used this product will be $5.3 \times 10^6$.

When laminations of kind $a$ and $b$ are alternately used, it will be found that this product is equal to $7 \times 10^6$.

Claims:

1. A pole piece for a magnet system for the interconversion of electrical and mechanical energy comprising laminations of different alloy compositions.

2. A pole piece for a magnet system for the interconversion of electrical and mechanical energy comprising laminations of different nickel alloy compositions.

3. A pole piece for a magnet system for the interconversion of electrical and mechanical energy comprising laminations of the same alloy composition which have different magnetic properties as the result of different heat treatments.

4. A pole piece for a magnet system for the interconversion of electrical and mechanical energy comprising a lamination having a high direct current permeability and a second lamination having a high alternating current permeability.

ROELOF VERMEULEN.
AREND THOMAS van URK.